United States Patent
Kons

(10) Patent No.: US 7,415,075 B2
(45) Date of Patent: Aug. 19, 2008

(54) MULTI-RATE ENCODING AND DECODING SYSTEM

(75) Inventor: Shachar Kons, Haifa (IL)

(73) Assignee: Conexant Systems, Inc., Newport Beach, CA (US)

( * ) Notice: Subject to any disclaimer, the term of this patent is extended or adjusted under 35 U.S.C. 154(b) by 813 days.

(21) Appl. No.: 10/284,121

(22) Filed: Oct. 29, 2002

(65) Prior Publication Data

US 2004/0081251 A1 Apr. 29, 2004

(51) Int. Cl.
*H04L 5/12* (2006.01)
*H04L 23/02* (2006.01)
*H03M 13/00* (2006.01)

(52) U.S. Cl. .................. 375/265; 714/755; 714/780; 714/790; 714/792

(58) Field of Classification Search .................. 375/265, 375/295, 302, 240; 370/203; 714/755, 780, 714/790, 792
See application file for complete search history.

(56) References Cited

U.S. PATENT DOCUMENTS

| | | | | | |
|---|---|---|---|---|---|
| 5,541,955 | A * | 7/1996 | Jacobsmeyer | ................ | 375/222 |
| 5,859,601 | A * | 1/1999 | Moon et al. | .................... | 341/59 |
| 6,052,821 | A * | 4/2000 | Chouly et al. | ................ | 714/790 |
| 6,112,326 | A * | 8/2000 | Khayrallah | ................. | 714/790 |
| 6,131,180 | A * | 10/2000 | Ramesh | ....................... | 714/790 |
| 6,212,661 | B1 * | 4/2001 | Rub et al. | ................... | 714/769 |
| 6,381,727 | B1 * | 4/2002 | Ikeda | .......................... | 714/780 |
| 6,578,173 | B2 * | 6/2003 | Alamouti | ..................... | 714/792 |
| 6,769,090 | B1 * | 7/2004 | Halder | ........................ | 714/792 |
| 7,065,695 | B2 * | 6/2006 | Cameron et al. | ............ | 714/755 |
| 2002/0034225 | A1 * | 3/2002 | Martini et al. | ......... | 375/240.01 |
| 2003/0026196 | A1 * | 2/2003 | Chan et al. | ................... | 370/203 |
| 2003/0223506 | A1 * | 12/2003 | Cameron et al. | ............ | 375/265 |
| 2003/0226087 | A1 * | 12/2003 | Cameron et al. | ............ | 714/755 |
| 2003/0226088 | A1 * | 12/2003 | Cameron et al. | ............ | 714/755 |
| 2003/0226095 | A1 * | 12/2003 | Cameron et al. | ............ | 714/792 |
| 2003/0226096 | A1 * | 12/2003 | Shen et al. | .................. | 714/796 |
| 2005/0058057 | A1 * | 3/2005 | Maltsev et al. | .............. | 370/203 |

OTHER PUBLICATIONS

Interrim Guidelines for Examination of Patent Applications for Patent Subject Matter Elgibility, pp. 50-57.*

* cited by examiner

*Primary Examiner*—Mohammad H. Ghayour
*Assistant Examiner*—Lawrence B Williams
(74) *Attorney, Agent, or Firm*—Haw-minn Lu

(57) ABSTRACT

A multi-rate encoder and decoder system is disclosed. The multi-rate encoder and decoder system is capable of operating with a mother code or a subset code of the mother code and includes a trellis encoder having a set of inputs and a set of outputs corresponding to the mother code and a select unit capable of removing the set of inputs into the trellis encoder that correspond to the mother code but not the subset code prior to encoding. The multi-rate encoder and decoder system further includes a decoder having a set of decoder inputs and a set of decoder outputs corresponding to the mother code and a decoder select unit capable of ignoring transitions in the trellis code produced by the encoder that belong to the mother code but not to the subset code.

36 Claims, 12 Drawing Sheets

MULTI-RATE ENCODING AND DECODING SYSTEM

BACKGROUND OF THE INVENTION

1. Field of the Invention

This invention relates generally to the field of communications. In particular, the invention relates to digital communication systems capable of encoding digital communication signals.

2. Related Art

The utilization of digital communication systems is growing at a rapid pace in today's society. Specifically, digital communication systems are becoming more common because they typically provide a higher level of performance than analog communication systems. Common examples of digital communication systems include digital radios, digital cellular telephones (utilizing frequency division multiple access "FDMA," time division multiple access "TDMA," code division multiple access "CDMA," global system for mobile communications "GSM," etc.), digital modems (utilizing such modulation schemes such as V.34, V.90, V.92, xDSL, etc.), satellite communications, and digital reproduction systems (i.e., compact disk "CD," digital video disks "DVD," digital audio tape "DAT," digital video "DV," MPEG, MP3, digital television "DTV," high-definition television "HDTV," etc.).

Digital communication systems generally provide a higher level of performance because they utilize digital modulation (such as amplitude phase keying "APK," phase shift keying "PSK," frequency shift keying "FSK," pulse coded modulation "PCM," pulse amplitude modulation "PAM," quadrature amplitude modulation "QAM," or a similar modulation scheme). Further, error detection and correction techniques allow for increased quality transmission of information data in a transmitting environment such as a communication channel. Typically, these digital communication systems utilize digital encoding schemes that reduce the effects of noise. These encoding schemes may include dependency among a large number of the transmitted digital symbols, thus enabling the receiver to make a more accurate detection of the received symbols. This is generally known as "error control coding" or utilizing "error correction code techniques."

FIG. 1 shows an example implementation of a known digital communication system 100. In FIG. 1, communication occurs via the transmission of data information 102 from a transmitter 104 to a receiver 106, over a channel 108. The transmission is generally a random experiment because the transmitter 104 typically transmits one of a number of possible messages that depend on the data information 102 (that is not known ahead of time). The receiver 106 has no knowledge of which message is transmitted by the transmitter 104, however, the transmitted message is chosen from a set of messages that are known to both the transmitter 104 and the receiver 106. The transmitted message depends in part on the modulator 110 and may be an information data signal that is modulated by a carrier wave signal. The carrier wave signal is determined by the modulation scheme utilized by the modulator 110 such as, for example, APK, PSK, FSK, PCM, PAM, QAM or other similar schemes. Additionally, the transmitted message is received by a demodulator and detector 112 at the receiver 106. The demodulator and detector 112 demodulates the received signal utilizing a demodulation scheme that corresponds to the modulation scheme of the modulator 110. After demodulation, the demodulator and detector 112 detects the received information data signal.

Error control coding is utilized to reduce the effects of errors in the data transmission and reception because the data information transmitted to the receiver 106 should be received ideally at the receiver without any errors. However, if errors exist in the data transmission, error control coding helps detect and/or remove the errors at the receiver. The error control coding may include, as an example, block coding, concatenated coding, waveform coding, turbo coding and convolution coding, all of which are well known in the art. As a result, FIG. 1 shows that transmitter 104 may include an encoder 114 and that the receiver 106 may include a decoder 116.

Besides improved resistance to channel noise, digital communication systems also include the advantages of improved resistance to interference, increased capacity, and improved security of communication through the utilization of encryption. Digital communication techniques generally optimize the data throughput of a digital communication system that has a limited signal-to-noise ratio ("SNR" or "S/N"). Encoding techniques further allow the digital communication system to make tradeoffs between smaller SNRs or higher data rates that may be utilized with a same bit-error rate ("BER").

In general, a convolutional encoder maps a signal composed of a k-bit sequence of input data bits ("k") to a unique n-bit sequence of data bits ("n") based on a convolution of the input sequence, k, with itself or with another signal. The amount of redundancy introduced by the encoding of the data is measured by the ratio "n/k." The reciprocal of this ratio, k/n, is known as the "code rate." The convolutional encoder generates a convolutional code by passing k through a linear finite-state shift register. In general, the shift register consists of K (k-bit) stages and n linear algebraic function generators. Typically, K is known as the "constraint length" and it represents the number of k-tuple stages in the shift register. The constraint length represents the number of k-bit shifts over which a single information bit may influence the encoder output. However, if the encoder includes "M" memory units (not shown) the "constraint length" is typically defined as M+1 instead of K. FIG. 2 shows an example of a typical convolutional encoder 200 with constraint length K and rate k/n.

In FIG. 2, a kK-stage shift register 202 is shown in signal communication with n modulo-2 adders 204, 206 and 208. The kK-stage shift register is a linear finite-state shift register with kK bit locations (several of which are labeled 210, 212, 214 and 216). At each unit of time, k bits 218 are shifted into the first k stages 210, 212 and 214 of the register 202; all the bits in the register 202 are shifted k stages to the right, and the outputs 220, 222 and 224 of the n adders 204, 206 and 208 are sequentially sampled, by a sampler 226, to yield the binary code symbols or code bits 228. These code symbols 228 are then utilized by the modulator (not shown) to specify the waveforms to be transmitted over the channel (not shown). Since there are n code bits for each input group of k message bits, the code rate is k/n message bit per code bit, where k<n. FIG. 3 shows another example of a convolution-type encoder 300.

In FIG. 3, the example encoder 300 includes three memory units M1 302, M2 304 and M3 306 and two adders 308 and 310. As an example, if the encoder 300 utilizes four functions "A," "B," "C" and "D," the input 312 to the encoder 300 may be defined as "U" and the state of the encoder 300 may be defined as "S." As a result, it is appreciated by those skilled in the art that the next state of the encoder 300 would be equal to A(S) plus B(U) and the output 314 of the encoder 300 would be equal to C(S) plus D(U). As such, encoder 300 may utilize any code represented by a trellis diagram.

The decoder 116, FIG. 1, decodes the demodulated and detected signal 118 output by the demodulator and detector 112. The demodulated and detected signal 118 is a received version of the n-bit sequence of data bits 120 produced by the encoder 114. It is appreciated by those skilled in the art, that for rate k/n codes, which are typically represented by a trellis diagram, the decoder 116 may utilize a Maximum Likelihood Sequence Estimator (such as the well known "Viterbi" algorithm) or a Maximum "A Posteriori" decoder (such as the "BCJR" algorithm described in "Optimal Decoding of Linear Codes for Minimizing Symbol Error Rate," by L. R. Bahl, J. Cocke, F. Jelinek and J. Raviv, pages 84-287, IEEE Transactions on Information Theory, published March of 1974, which herein incorporated by reference).

However, both of these decoding schemes are based on the unique trellis structure of the code. This unique trellis structure requires that the encoder 114 and decoder 116 utilize specialize hardware, that is configured for a specific code, to encode and decode the signal. Unfortunately, this results in lack of flexibility because the encoder 114 and decoder 116 must be designed and custom fabricated for a specific code.

Therefore there is a need for a multi-rate encoding and decoding system that allows the flexibility to utilize multiple types of convolution codes with the same hardware to balance the payload capacity of the system versus the operating SNR.

Past attempts to solve this problem have included utilizing punctured codes where single bits are deleted at intervals in a low-rate convolutional code. In this approach, a puncturing coder suppresses the bits for which the puncturing algorithm contains a "0" and transmits the bits for which the algorithm contains a "1." Generally, punctured codes may be decoded in the same manner as the originally non-punctured code, however, in most situations there is a non-punctured code at the same rate that gives better performance, especially when trellis coded modulation ("TCM") is utilized. Therefore, there is also a need for a multi-rate encoding and decoding system that is capable of utilizing multiple convolution codes with the same hardware and is of low complexity.

SUMMARY

A multi-rate encoder capable of operating with a mother code or a subset code of the mother code is disclosed. The multi-rate encoder may include a trellis encoder having a set of inputs and a set of outputs corresponding to the mother code and a select unit capable of removing the set of inputs into the trellis encoder that correspond to the mother code but not the subset code prior to encoding.

Additionally, a multi-rate decoder capable of operating with a mother code or a subset code of the mother code is also disclosed. The multi-rate decoder may include a decoder having a set of decoder inputs and a set of decoder outputs corresponding to the mother code and a decoder select unit capable of ignoring transitions in a trellis code produced by an encoder, where the transitions in the trellis code belong to the mother code but not to the subset code.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
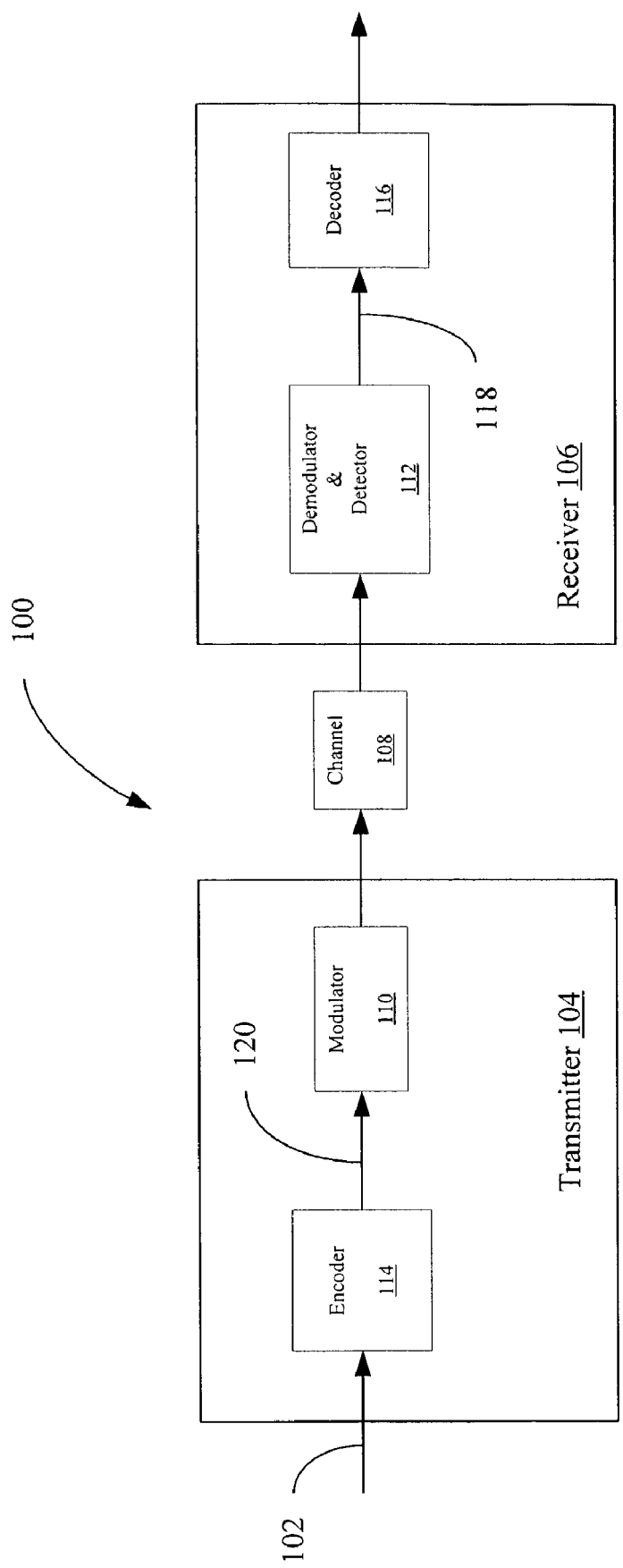
FIG. 1 shows a block diagram of an example implementation of known digital communication system.
Figure 2:
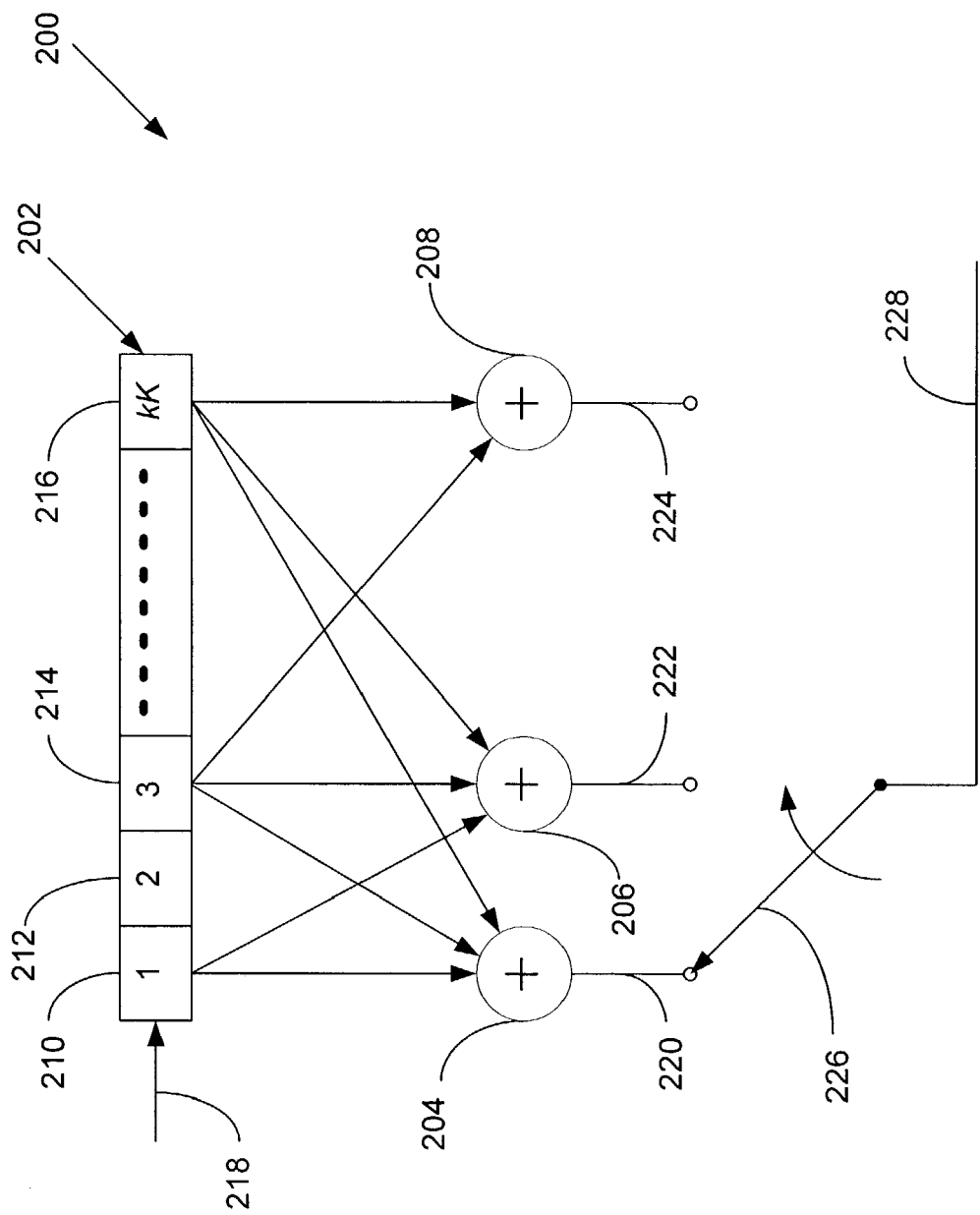
FIG. 2 shows a block diagram for an example convolutional encoder with constraint length K and rate k/n.
Figure 3:
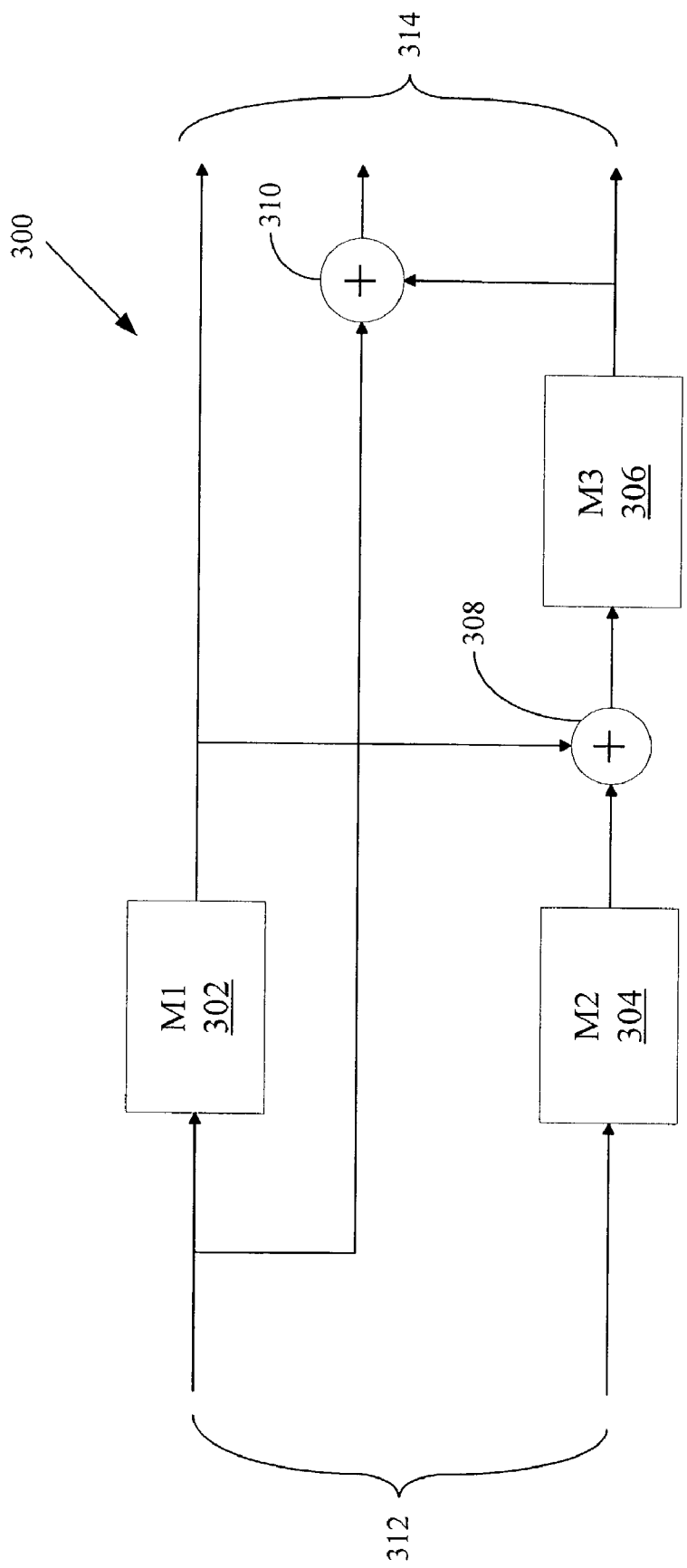
FIG. 3 shows a block diagram for another example convolution-type encoder utilizing multiple memory elements.
Figure 4:
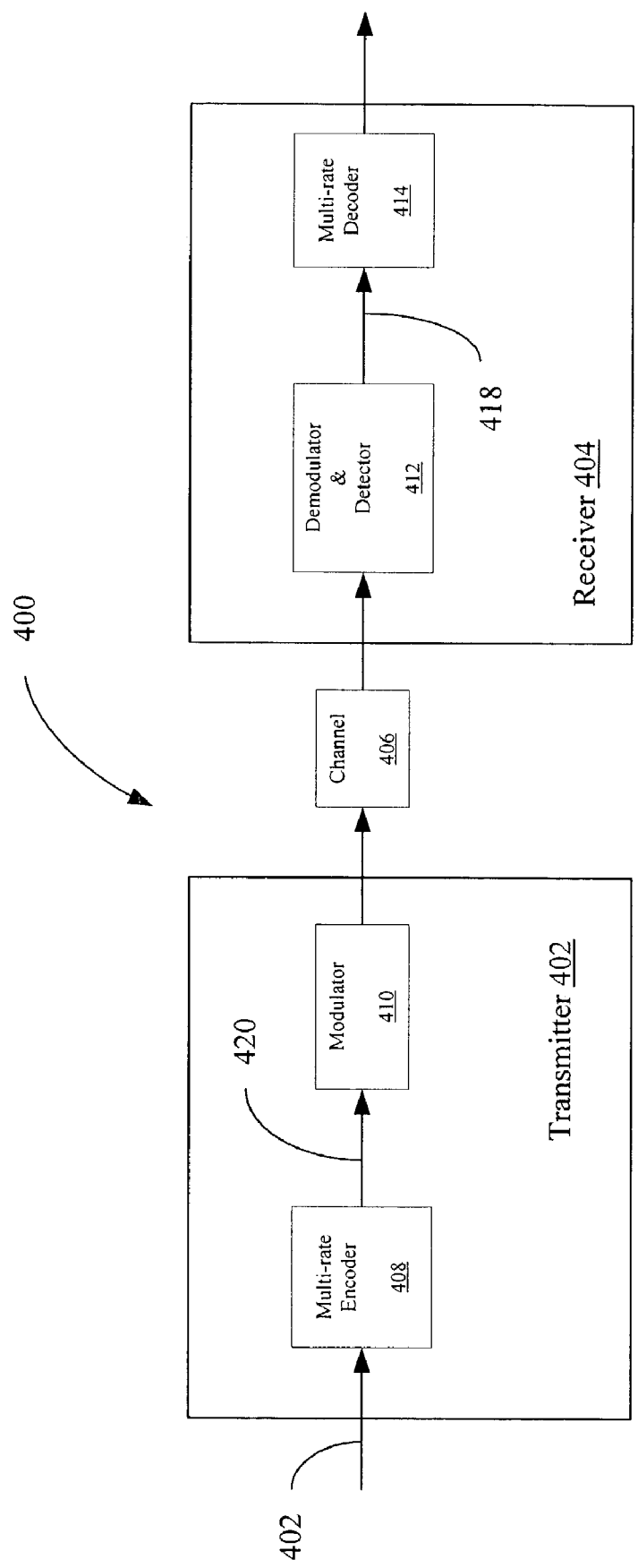
FIG. 4 shows a block diagram of an example implementation of Multi-rate encoding and decoding system ("MEDS").

FIG. 4 shows an example implementation of Multi-rate encoding and decoding system ("MEDS") 400. MEDS 400 may be implemented within a digital radio, digital cellular telephone (utilizing frequency division multiple access "FDMA," time division multiple access "TDMA," code division multiple access "CDMA," global system for mobile communications "GSM," etc.), digital modem (utilizing such modulation schemes such as V. 34, V. 90, V. 92, xDSL, etc.), satellite communications, and digital reproduction system (i.e., compact disk "CD," digital video disks "DVD,"digital audio tape "DAT," digital video "DV," MPEG, MP 3, digital television "DTV," high-definition television "HDTV," and the like).

In FIG. 4, MEDS 400 includes a transmitter 402 and receiver 404 in signal communication via a channel 406. The transmitter 402 may include a multi-rate encoder 408 and a modulator 410. The receiver 404 may include a demodulator and detector 412 and decoder 414. The modulator 410 and demodulator and detector 412 may utilize digital modulation (such as amplitude phase keying "APK," phase shift keying "PSK," frequency shift keying "FSK," pulse coded modulation "PCM," pulse amplitude modulation "PAM," quadrature amplitude modulation "QAM," or similar modulation scheme). The multi-rate encoder 408 may be a convolutional encoder capable of operating at different code rates k/n. Similarly, the multi-rate decoder 414 may be a convolutional decoder capable of operating at different code rates.

As an example, the multi-rate encoder 408 and multi-rate decoder 414 may both operate at a code rate k'/n' (which will be referred to as a "subset code") that is different than the code rate k/n (which will be referred to as a "mother code") of the multi-rate encoder 408 and multi-rate decoder 414. The multi-rate encoder 408 may generate the subset code k'/n' by removing some of the inputs and outputs of the mother code. As a result, k'≦k and n'≦n.

In an example of operation, given the input and output vectors $\underline{U}=\{u_1, u_2, \ldots u_k\}$ and $\underline{C}=\{C_1, C_2, \ldots C_n\}$, the multi-rate encoder 408 and multi-rate decoder 414 may reduce the number of inputs and outputs by $A=\{a_1, a_2, \ldots a_{k-k'}\}$ and $B=\{b_1, b_2, \ldots b_{n-n'}\}$, respectively. The multi-rate encoder 408 may utilize the new code rate k'/n' by setting the values of the inputs $u_{a_j}$ to zero. Because the convolutional code is a linear code, a zero input will have no effect on the outputs and on the next state of the code. Also, the multi-rate encoder 408 may ignore the outputs $c_{b_i}$. The new rate k'/n' decoder will ignore all the branches of the trellis that are associated with a bit value of "1" in one of the $a_i$ positions. Ignoring the trellis branches may be implemented by setting their branch metrics to either infinity (for a decoder selecting minimum values) or minus infinity (for a decoder selecting maximum values). If the branch metrics of the non-ignored branches are generated from information associated with the $u_{a_j}$ inputs, this information should be set to zero. The new decoder will also ignore the $c_{b_i}$ outputs. Thus, a low-complexity multi-rate decoder 414 for the subset code k'/n' may be generated, by adding multiplexers to the hardware implementation of the rate k/n decoder, selecting between regular branch metrics computations and constants infinity (or minus infinity).

Figure 5:
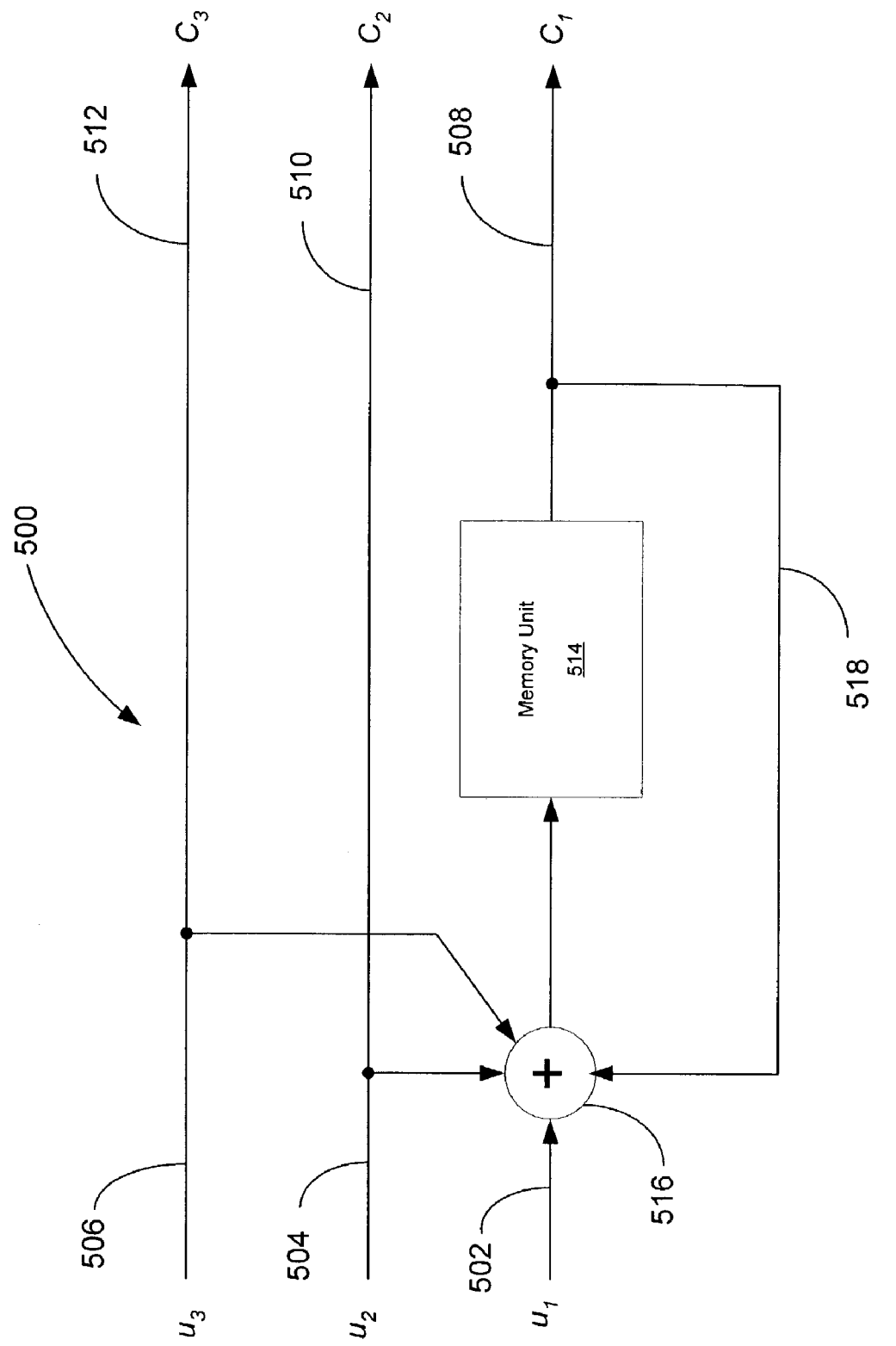
FIG. 5 shows a block diagram of an example implementation of the Multi-rate encoder block shown in FIG. 4 with constraint length M+1.

FIG. 5. shows an example implementation of the multi-rate encoder 500 operating at code rate of 3/3 with constraint length M+1. The multi-rate encoder 500 may include three inputs $u_1$ 502, $u_2$ 504 and $u_3$ 506 and three outputs $c_1$ 508, $c_2$ 510 and $c_3$ 512. The multi-rate encoder 500 may also include a memory unit 514 and summation unit 516. As an example of operation, the multi-rate encoder 500 produces the following output values $c_1$ 508, 510 and $c_3$ 512 that correspond to the inputs values $u_1$ 502, $u_2$ 504 and $u_3$ 506 in Table 1 where $u_1$ 502 corresponds to the state of the encoder 500.

TABLE 1

| $u_3, u_2, u_1$ | $c_1, c_2, c_3$ |
|---|---|
| State 0 | |
| 000 | 000 |
| 001 | 000 |
| 010 | 010 |
| 011 | 010 |
| 100 | 100 |
| 101 | 100 |
| 110 | 110 |
| 111 | 110 |
| State 1 | |
| 000 | 001 |
| 001 | 001 |
| 010 | 011 |
| 011 | 011 |
| 100 | 101 |
| 101 | 101 |
| 110 | 111 |
| 111 | 111 |

Figure 6:
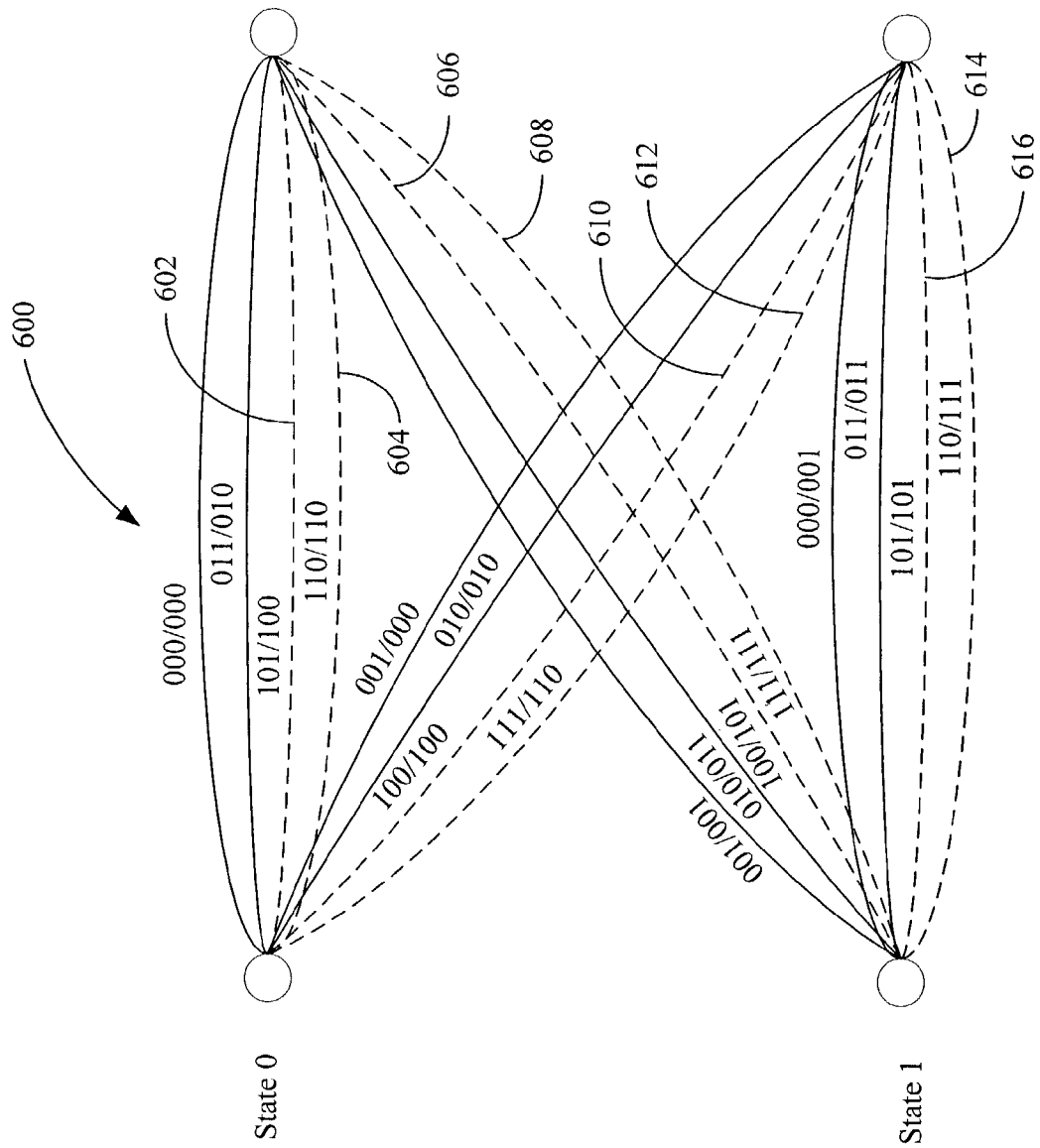
FIG. 6 shows an example trellis structure produced by the Multi-rate encoder of FIG. 4.
Figure 7:
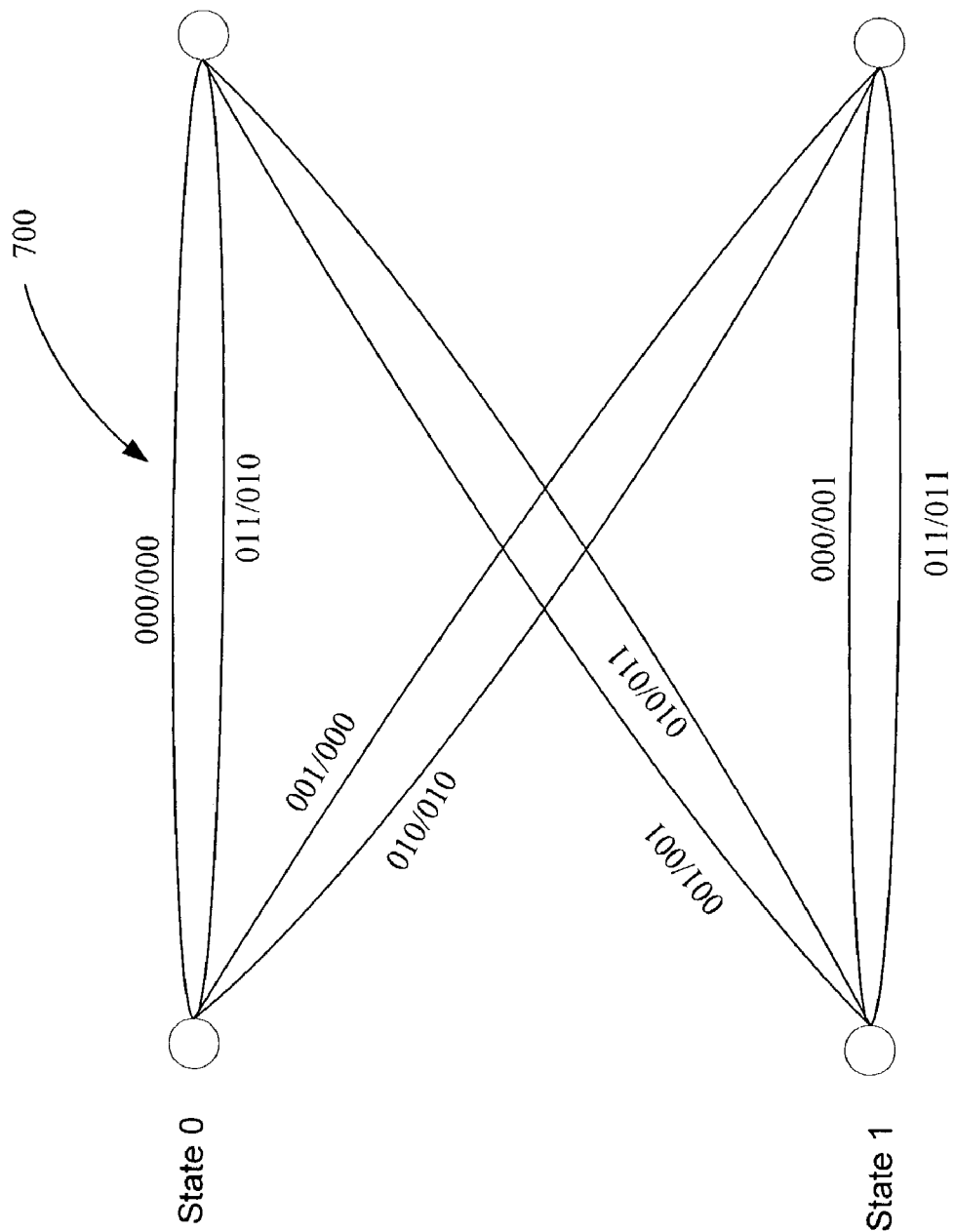
FIG. 7 shows an example sub-code trellis structure produced by the Multi-rate encoder of FIG. 4 where the sub-code is of the trellis structure shown in FIG. 6.

As an example, the multi-rate encoder 508 may operate at a new code rate of 2/2 by removing the input 506 and output 512. In this example, A={3} and B={3}. The trellis diagram 600 of the code rate 3/3 mother code is shown in FIG. 6 with branches labeled with input/output ($u_3, u_2, u_1/c_3, c_2, c_1$) associated with each branch and described in Table 1. FIG. 7 shows the new trellis diagram 700 of the rate 2/2 code that may be derived from the same trellis diagram 600, FIG. 6, by removing the branches marked with a dashed lines 610, 612 and 614. The branch metric for these branches may be set to infinity (or minus infinity). The branch metrics and decoder outputs will only consider the inputs $u_2 u_1$ and the outputs $c_2 c_1$.

Figure 8:
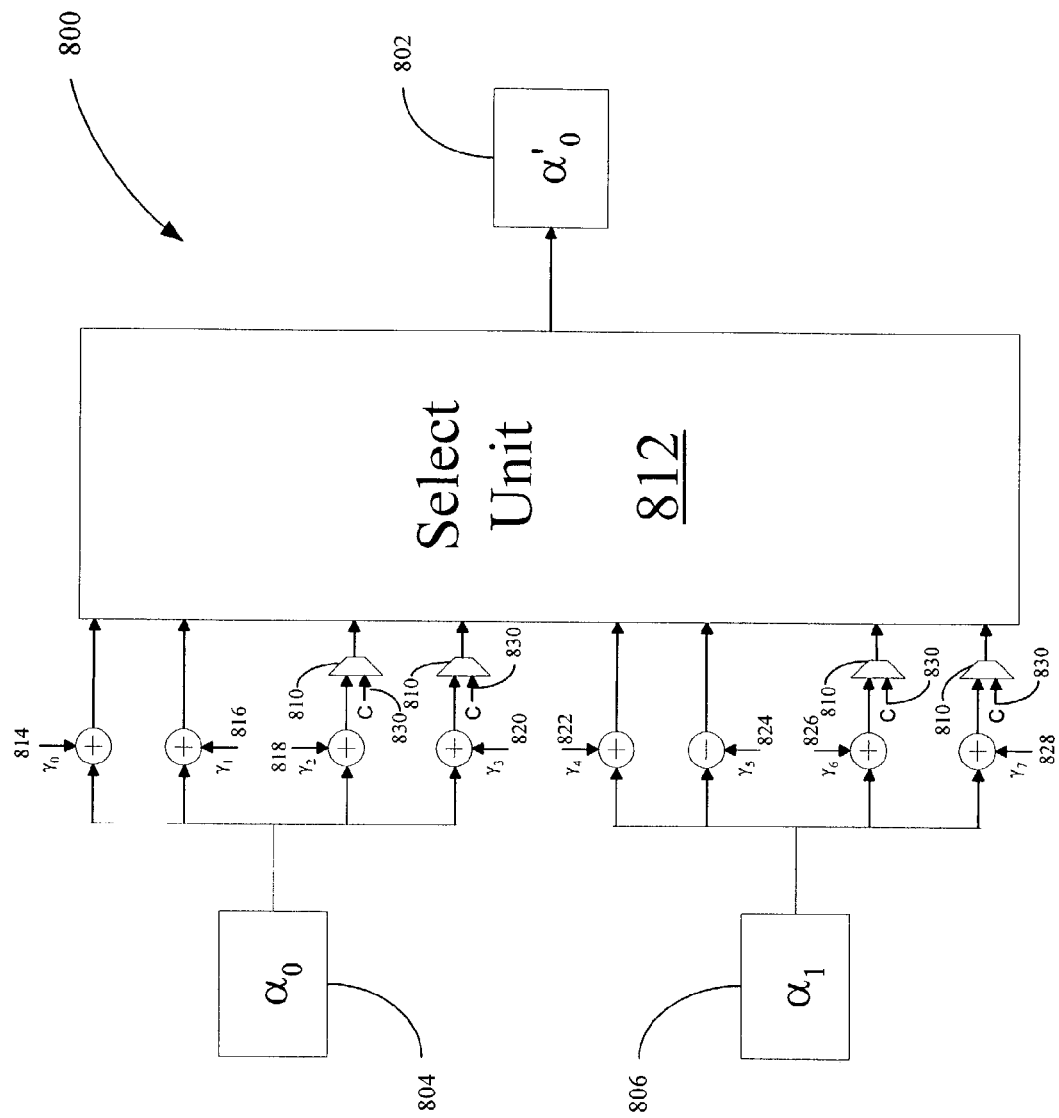
FIG. 8 is a block diagram of an example implementation of a hardware architecture for updating the next state metric utilizing a constant value "C" multiplexed with the input values to a select unit.
Figure 9:
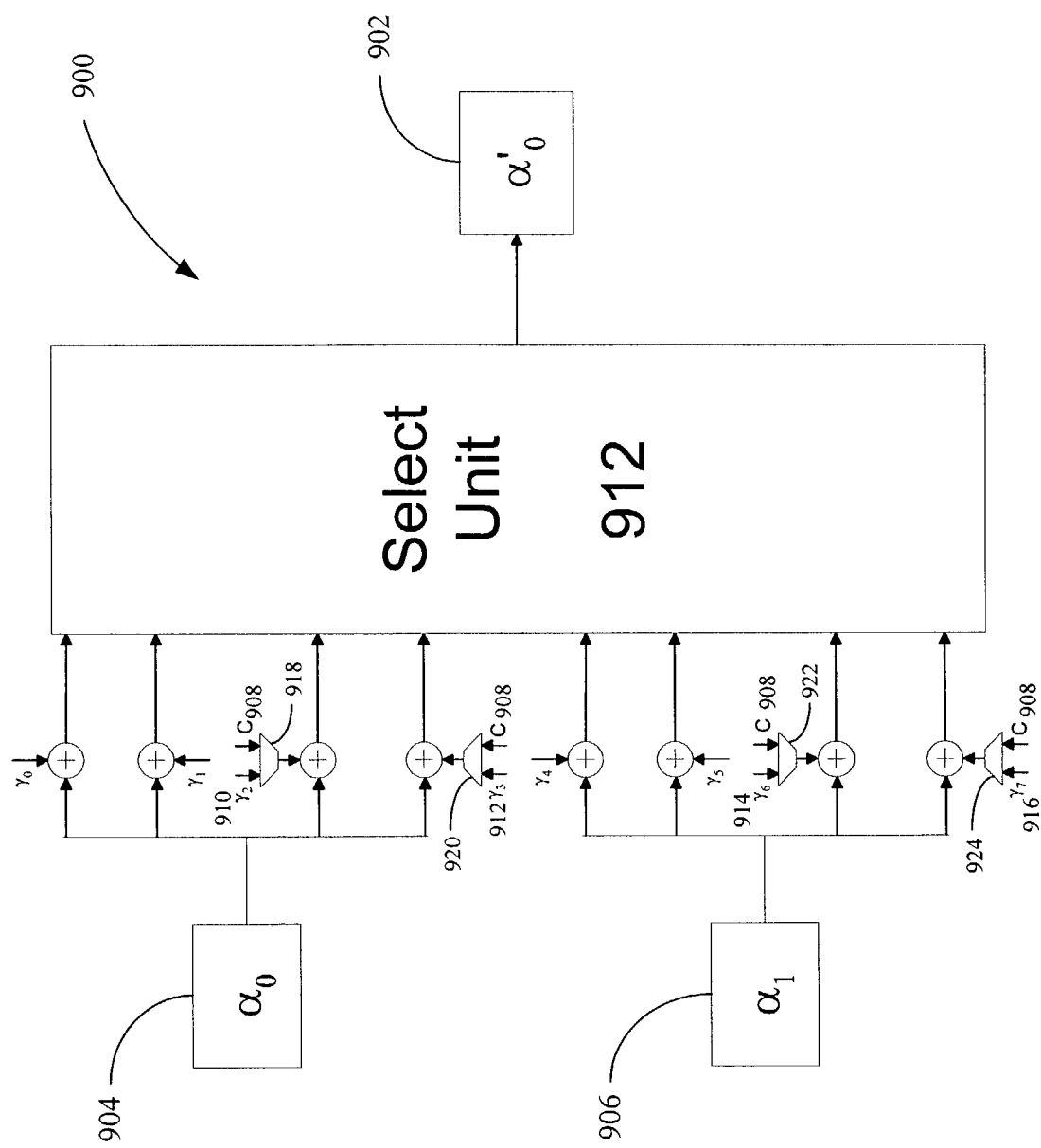
FIG. 9 is a block diagram of another example implementation of a hardware architecture for updating the next state metric utilizing a constant value "C" multiplexed with the branch metrics.
Figure 10:
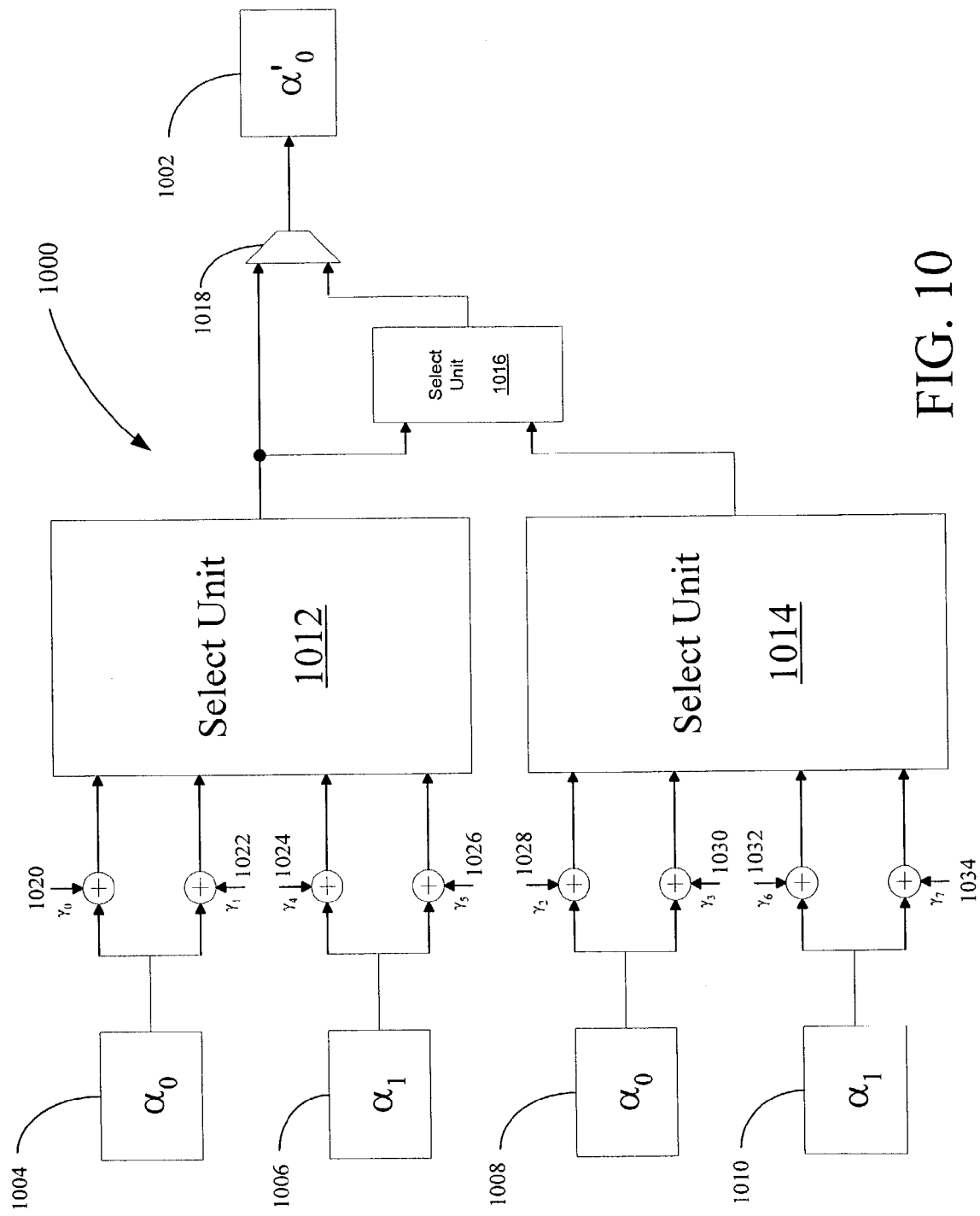
FIG. 10 is a block diagram of another example implementation of a hardware architecture for updating the next state metric.

FIGS. 8, 9 and 10 show different example implementations of a hardware architecture for updating the next state metric using the example code rate 2/2, which is the sub-set of a rate 3/3 code. The examples show three example hardware architecture implementations for updating the next state metric $\alpha'_0$ from the previous state metrics $\alpha_0$, $\alpha_1$ and the branch metrics $\gamma_0, \gamma_1, \gamma_3, \gamma_2, \gamma_4, \gamma_5, \gamma_6, \gamma_7$. The "select" operation chooses the most preferable value from the possible input values. In decoding, this usually relates to the most probable transition in the trellis. The "select" operation may be chosen to maximize the values, to minimize the values, or to perform more complex operations such as the max* operation.

In FIG. 8, an example implementation is shown of a hardware architecture 800 for updating the next state metric $\alpha'_0$ 802 from the previous state metrics $\alpha'_0$ 804 and $\alpha_1$ 806 utilizing a constant value "C" 808 multiplexed 810 with the input values to a select unit 812. The input values are equal to the previous state metrics $\alpha_0$ 804 and $\alpha_1$ 806 combined (via adders as an example) with branch metrics $\gamma_0$ 814, $\gamma_2$ 816, $\gamma_2$ 818, $\gamma_3$ 820, $\gamma_4$ 822, $\gamma_5$ 824, $\gamma_6$ 826, and $\gamma_7$ 828. The values at the input of the select unit 812, which correspond to transitions that are removed from the original trellis diagram 600 (of the mother code), are multiplexed 810 with the constant C. The value of C is generally selected so that the C input 830 will not be chosen by the select unit 812. Thus, for the mother code rate 3/3 decoder, all the inputs to the select unit 812 are unmodified, while for the subset code rate 2/2 decoder, the multiplexers 810 select the constants C.

Similarly, in FIG. 9, another example implementation is shown of a hardware architecture 900 for updating the next state metric $\alpha'_0$ 902 from the previous state metrics $\alpha_0$ 904 and $\alpha_1$ 906 utilizing a constant value C 908 multiplexed with the branch metrics $\gamma_2$ 910, $\gamma_3$ 912, $\gamma_6$ 914 and $\gamma_7$ 916. Unlike in FIG. 8, in FIG. 9 the multiplexers 918, 920, 922 and 924 operate on the branch metric directly $\gamma_2$ 910, $\gamma_3$ 912, $\gamma_6$ 914 and $\gamma_7$ 916. In other words, instead of applying the normal branch metric to an adder coupled to the previous state metric, a modified branch metric is applied when subset codes are in use. In particular, the value of C is utilized as the modified branch metric. The value of C is selected such that the application of the modified branch metric to the previous state metric will yield a result that the selection unit 912 will ignore in favor of other possibilities.

In FIG. 10, another example implementation is shown of a hardware architecture 1000 for updating the next state metric $\alpha'_0$ 1002 from the previous state metrics $\alpha_0$ 1004, 1006 and, 1008, 1010 utilizing three select units 1012, 1014 and 1016 and a multiplexer 1018 that process branch metrics $\gamma_0$ 1020, $\gamma_1$ 1022, $\gamma_2$ 1024, $\gamma_3$ 1026, $\gamma_4$ 1028, $\gamma_5$ 1030, $\gamma_6$ 1032, and $\alpha_1$, $\gamma_7$ 1034. Unlike FIGS. 8, 9, in FIG. 10, there is no constant C and the multiplexer 1018 allows the decoder to ignore the undesired values when operating as a code rate 2/2 decoder.

Figure 11:
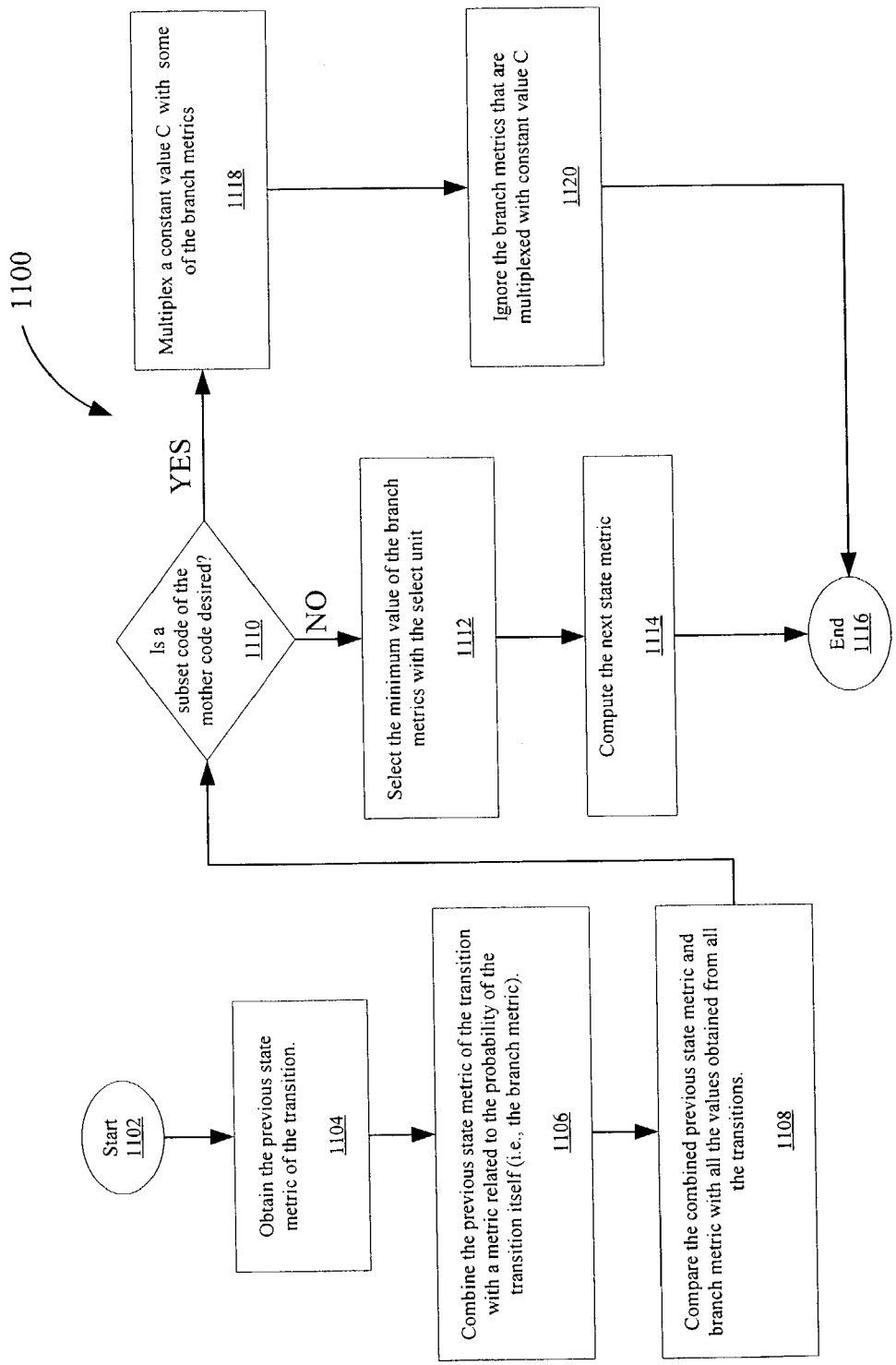
FIG. 11 is a flow chart of an example process performed by the MEDS, based on the example hardware architecture shown in FIG. 8, in forward processing a trellis code.

Generally, when a decoder processes a trellis code the decoder saves information for all the states (i.e., state metrics), which are related to the probability of each state being in the correct state compared to the encoding process. As an example, FIG. 11 shows a flow chart 1100 of an example process performed by the MEDS 400, based on the example hardware architecture 800 shown in FIG. 8, in forward processing a trellis code. The process begins 1102 by computing the next state metric. The next state metric is computed from all the transitions (i.e., branches) to this state by taking 1104 the previous state metric of the transition and combining it 1106 with a metric related to the probability of the transition itself (i.e., the branch metric). The combining 1106 may then be accomplished by either adding, multiplying or performing any other similar combination operation. The combined previous state metric and branch metric are compared 1108, in a select unit, with all the values obtained from all the transitions. If the mother code is desired 1110, the minimum value of the branch metrics is then selected by the select unit 1112 and the next state metric is computed from the selected minimum value 1114. The process then ends 1116.

If the subset code of the mother code is desired, a C (e.g., a constant) may be multiplexed 1118 with pre-selected branch metrics. The value of C is set to a value worse than any of the branch metrics so that it will not be selected by the select unit. In response, the select unit will ignore 1120 the branch metrics that are multiplexed with C. The process then ends 1116. As a result, those transitions that were part of the mother code but not part of the subset code will be ignored and therefore not interfere with the computations. It is appreciated by those skilled in the art, that the processing of the trellis might also be done backwards (such as in the BCJR algorithm) where the same operations are performed to compute the previous state metrics.

Similar to the process described in FIG. 11, the hardware architecture 900 shown in FIG. 9 also utilizes a value C to ignore the those transitions that were part of the mother code but not part of the subset code. However, unlike the process described in FIG. 11, the hardware architecture 900 replaces the corresponding branch metrics before they are combined with the previous state metric.

Figure 12:
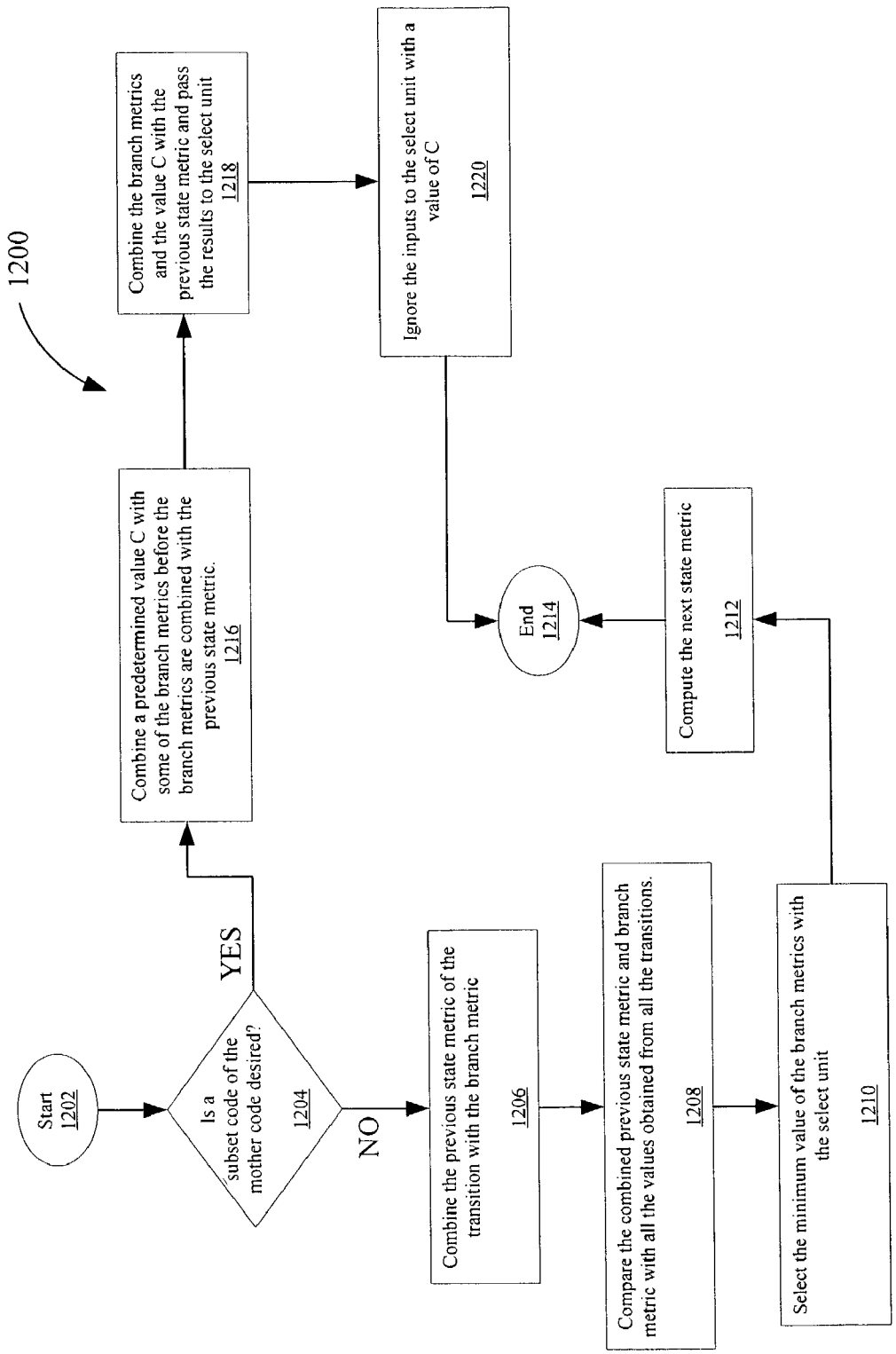
FIG. 12 is a flow chart of another example process performed by the MEDS, based on the example hardware architecture shown in FIG. 9, in forward processing a trellis code.

As an example, FIG. 12 shows another flow chart 1200 of an example process performed by the MEDS 400, based on the example hardware architecture 900 shown in FIG. 9, in forward processing a trellis code. The process begins 1202 by computing the next state metric. If the mother code is desired 1204, the next state metric is computed from all the transitions to this state by taking the previous state metric of the transition and combining it 1206 with branch metric. Again, the combining 1206 may then be accomplished by either adding, multiplying or performing any other similar combination operation. The combined previous state metric and branch metric are compared 1208, in a select unit, with all the values obtained from all the transitions. The minimum value of the branch metrics is then selected by the select unit 1210 and the next state metric is computed from the selected minimum value 1212. The process then ends 1214.

If the subset code of the mother code is desired, a predetermined value C (e.g., a constant) may be combined (such as multiplexed) 1216 with some of the branch metrics before the branch metric is combined with the previous state metric. The value of C is set to a value worse than any of the branch metrics so that it will not be selected by the select unit. Then, the branch metrics and the value C are combined with the previous state metric 1218 and the result passed to the select unit. In response, the select unit will ignore 1220 the inputs with a value of C. The process then ends 1222. Again, as a result, those transitions that were part of the mother code but not part of the subset code will be ignored and therefore not interfere with the computations. It is again appreciated by those skilled in the art, that the processing of the trellis might also be done backwards (such as in the BCJR algorithm) where the same operations are performed to compute the previous state metrics.

Additionally, the process performed by the hardware architecture 1000 shown in FIG. 10 does not utilize predetermined values such C. Instead, the hardware architecture 1000 combines all the transitions that will be non-valid in the subset code and then ignores them when utilizing the subset code.

The process performed by the MEDS 400 may be performed by hardware or software. If the process is performed by software, the software may reside in software memory (not shown) in the MEDS 400. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium"and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A multi-rate encoder capable of operating with a mother code or a subset code of the mother code, the multi-rate encoder comprising:

a trellis encoder having a set of inputs and a set of outputs corresponding to the mother code; and a select unit capable of removing the set of inputs into the trellis encoder that correspond to the mother code but not the subset code prior to encoding, wherein the trellis encoder is capable of encoding any code that is represented by a trellis diagram, and wherein the trellis diagram has branches associated with the inputs of the mother code and wherein the select unit removes branches associated with the inputs of the mother code and not associated with the inputs of the subset code.

2. The multi-rate encoder of claim 1, wherein the select unit is capable of removing a subset of the set of outputs from the trellis encoder that correspond to the mother code but not the subset code prior to encoding.

3. The multi-rate encoder of claim 1, wherein the select unit removes the set of inputs by setting the inputs to a value approximately equal to zero.

4. The multi-rate encoder of claim 2, further comprising:
a decoder having a set of decoder inputs and a set of decoder outputs corresponding to the mother code; and
a decoder select unit capable of ignoring branches in a trellis diagram representing the trellis code produced by the encoder, said branches belonging to the mother code but not to the subset code.

5. The multi-rate encoder of claim 4, wherein the decoder select unit is capable of removing the set of decoder outputs that belong to the mother code but not to the subset code.

6. The multi-rate encoder of claim 4, wherein the decoder is capable of generating a first set of branch metrics for the mother code and a second set of branch metrics for the subset code.

7. A multi-rate encoder and decoder system capable of operating with a mother code or a subset code of the mother code, the multi-rate encoder and decoder system comprising:
a trellis encoder having a set of inputs and a set of outputs corresponding to the mother code, wherein the trellis encoder is capable of encoding any code that is represented by a trellis diagram and wherein the trellis diagram has branches associated with the inputs of the mother code and wherein the select unit removes branches associated with the inputs of the mother code and not associated with the inputs of the subset code;
a select unit capable of removing the set of inputs into the trellis encoder that correspond to the mother code but not the subset code prior to encoding;
a decoder having a set of decoder inputs and a set of decoder outputs corresponding to the mother code; and
a decoder select unit capable of ignoring branches in a trellis diagram representing the trellis code produced by the encoder, said branches belonging to the mother code but not to the subset code.

8. The multi-rate encoder and decoder system of claim 7, wherein the select unit is capable of removing a subset of the set of outputs from the trellis encoder that correspond to the mother code but not the subset code prior to encoding.

9. The multi-rate encoder of claim 7, wherein the select unit removes the set of inputs by setting the inputs to a value approximately equal to zero.

10. The multi-rate encoder of claim 7, wherein the decoder select unit is capable of removing the set of decoder outputs that belong to the mother code but not to the subset code.

11. The multi-rate encoder of claim 7, wherein the decoder is capable of generating a first set of branch metrics for the mother code and a second set of branch metrics for the subset code.

12. A multi-rate decoder capable of operating with a mother code or a subset code of the mother code, the multi-rate decoder comprising:
a decoder having a set of decoder inputs and a set of decoder outputs corresponding to the mother code; and
a decoder select unit capable of ignoring branches in a trellis diagram representing a trellis code produced by an encoder having an encoder select unit, wherein the branches associated with the inputs of the mother code and not associated with the inputs of the subset code are removed by the encoder select unit.

13. The multi-rate decoder of claim 12, wherein the decoder select unit is capable of removing the set of decoder outputs that belong to the mother code but not to the subset code.

14. A method for producing multi-rate encoding in a trellis encoder, the method comprising:
receiving a set of inputs in the trellis encoder that corresponds to a mother code, wherein the trellis encoder is capable of encoding any code that is represented by a trellis diagram and wherein the trellis diagram has branches associated with the inputs of the mother code and wherein the select unit removes branches associated with the inputs of the mother code and not associated with the inputs of the subset code;
selecting the code rate of the trellis encoder prior to encoding; and
producing a set of outputs in the trellis encoder.

15. The method of claim 14, wherein selecting includes removing the set of inputs into the trellis encoder that correspond to the mother code but not a subset code of the mother code prior to encoding.

16. The method of claim 15, wherein removing includes setting the inputs to a value approximately equal to zero.

17. The method of claim 15, wherein selecting includes removing a subset of the set of inputs from the trellis encoder that correspond to the mother code but not the subset code prior to encoding.

18. The method of claim 14, further including:
decoding the set of outputs from the trellis encoder with a decoder having a set of decoder outputs corresponding to the mother code; and
ignoring branches in a trellis diagram representing the trellis code produced by the trellis encoder, said branches belonging to the mother code but not the subset code.

19. The method of claim 18, further including removing the set of decoder outputs that belong to the mother code but not to the subset code.

20. The method of claim 19, further including generating a first set of branch metrics for the mother code and a second set of branch metrics for the subset code.

21. A method for receiving multi-rate encoded signals from a trellis encoder in a decoder having a set of decoder outputs corresponding to the mother code, the method comprising:
decoding the encoded signals from the trellis encoder with the decoder; and
ignoring branches in a trellis diagram representing the trellis code produced by the trellis encoder having an encoder select unit, wherein the branches associated with the inputs of the mother code and not associated with the inputs of the subset code are removed by the encoder select unit.

22. The method of claim 21, further including removing the set of decoder outputs that belong to the mother code but not to the subset code.

23. The method of claim 22, further including generating a first set of branch metrics for the mother code and a second set of branch metrics for the subset code.

24. A method for encoding and decoding multi-rate encoded signals, the method comprising:
receiving a set of inputs in a trellis encoder that corresponds to a mother code;
selecting the code rate of the trellis encoder prior to encoding, wherein the trellis encoder is capable of encoding any code that is represented by a trellis diagram, and wherein the trellis diagram has branches associated with the inputs of the mother code and wherein the select unit removes branches associated with the inputs of the mother code and not associated with the inputs of the subset code;

producing a set of outputs from the trellis encoder that correspond to a subset code of the mother code;

decoding the set of outputs from the trellis encoder with a decoder; and ignoring branches in a trellis diagram representing the trellis code produced by the trellis encoder, said branches belonging to the mother code but not the subset code.

25. The method of claim 24, wherein selecting includes removing the set of inputs into the trellis encoder that correspond to the mother code but not a subset code prior to encoding.

26. The method of claim 25, wherein removing includes setting the inputs to a value approximately equal to zero.

27. The method of claim 24, wherein ignoring further includes removing a subset the set of decoder outputs from the decoder that correspond to the mother code but not a subset code.

28. A multi-rate encoder capable of operating with a mother code or a subset code of the mother code, the multi-rate encoder comprising:

a trellis encoder having a set of inputs and a set of outputs corresponding to the mother code, wherein the trellis encoder is capable of encoding any code that is represented by a trellis diagram, wherein the trellis diagram has branches associated with the inputs of the mother code and wherein the select unit removes branches associated with the inputs of the mother code and not associated with the inputs of the subset code; and means for removing the set of inputs into the trellis encoder that correspond to the mother code but not the subset code prior to encoding.

29. The multi-rate encoder of claim 28, wherein the removing means is capable of removing a subset of the set of outputs from the trellis encoder that correspond to the mother code but not the subset code prior to encoding.

30. The multi-rate encoder of claim 28, wherein the removing means removes the set inputs by setting the inputs to a value approximately equal to zero.

31. The multi-rate encoder of claim 29, further comprising:

a decoder having a set of decoder inputs and a set of decoder outputs corresponding to the mother code; and means for ignoring branches in a trellis diagram representing the trellis code produced by the encoder, said branches belonging to the mother code but not to the subset code.

32. The multi-rate encoder of claim 31, wherein the ignoring means is capable of removing the set of decoder outputs that belong to the mother code but not to the subset code.

33. The multi-rate encoder of claim 31, wherein the decoder is capable of generating a first set of branch metrics for the mother code and a second set of branch metrics for the subset code.

34. A multi-rate decoder capable of operating with a mother code or a subset code of the mother code, the multi-rate decoder comprising:

a decoder having a set of decoder inputs and a set of decoder outputs corresponding to the mother code; and means for ignoring branches in a trellis diagram representing in a trellis code produced by an encoder having an encoder select unit, wherein the branches associated with the inputs of the mother code and not associated with the inputs of the subset code are removed by the encoder select unit.

35. The multi-rate decoder of claim 34, wherein the ignoring means is capable of removing the set of decoder outputs that belong to the mother code but not to the subset code.

36. A multi-rate encoder and decoder system capable of operating with a mother code or a subset code of the mother code, the multi-rate encoder and decoder system comprising:

a trellis encoder having a set of inputs and a set of outputs corresponding to the mother code, wherein the trellis encoder is capable of encoding any code that is represented by a trellis diagram, and wherein the trellis diagram has branches associated with the inputs of the mother code and wherein the select unit removes branches associated with the inputs of the mother code and not associated with the inputs of the subset code;

means for removing the set of inputs into the trellis encoder that correspond to the mother code but not the subset code prior to encoding;

a decoder having a set of decoder inputs and a set of decoder outputs corresponding to the mother code; and means for ignoring branches in a trellis diagram representing the trellis code produced by the encoder, said branches belonging to the mother code but not to the subset code.

* * * * *